United States Patent [19]

Smutny

[11] Patent Number: 4,950,703

[45] Date of Patent: Aug. 21, 1990

[54] STABILIZED CARBONMONOXIDE-OLEFIN COPOLYMER COMPOSITIONS

[75] Inventor: Edgar J. Smutny, Houston, Tex.

[73] Assignee: Shell Oil Company, Houston, Tex.

[21] Appl. No.: 351,369

[22] Filed: May 15, 1989

[51] Int. Cl.$^5$ .............................................. C08K 5/13
[52] U.S. Cl. ...................................................... 524/327
[58] Field of Search ................ 524/327; 526/154, 114; 523/125; 528/392

[56] References Cited

U.S. PATENT DOCUMENTS

| | | | |
|---|---|---|---|
| 3,418,348 | 12/1968 | Shepherd et al. | 524/327 |
| 3,432,445 | 3/1969 | Osgan et al. | 526/154 |
| 3,676,401 | 7/1972 | Henry | 523/126 |
| 3,694,412 | 9/1972 | Nozaki | 260/63 CQ |
| 3,753,952 | 8/1973 | Guillet | 523/125 |
| 4,104,247 | 8/1978 | Kato et al. | 524/327 |
| 4,107,416 | 8/1978 | Giannini et al. | 526/114 |

OTHER PUBLICATIONS

Gerald Scott: *Developments in Polymer Stabilization-5*, 71–85, (1982).

*Primary Examiner*—Veronica P. Hoke

[57] ABSTRACT

Compositions comprising linear alternating polymers of carbon monoxide and at least one ethylenically unsaturated hydrocarbon are stabilized against undue loss of crystallinity during melting/solidification cycles by the inclusion therein of an aluminum phenoxide.

18 Claims, No Drawings

STABILIZED CARBONMONOXIDE-OLEFIN COPOLYMER COMPOSITIONS

FIELD OF THE INVENTION

This invention relates to compositions comprising a linear alternating polymer of carbon monoxide and at least one ethylenically unsaturated hydrocarbon. More particularly, the invention relates to compositions of such polymers which are stabilized against undue loss of crystallinity upon multiple melting/solidification cycles.

BACKGROUND OF THE INVENTION

The class of polymers of carbon monoxide and olefin(s) has been known for a number of years. Brubaker, U.S. Pat. No. 2,495,286, produced such polymers of relatively low carbon monoxide content in the presence of free radical initiators, e.g., peroxy compounds. U.K. No. 1,081,304 produced similar polymers of higher carbon monoxide content in the presence of alkylphosphine complexes of palladium salts as catalyst. Nozaki extended the reaction to produce linear alternating polymers in the presence of arylphosphine complexes of palladium moieties and certain inert solvents. See, for example, U.S. Pat. No. 3,694,412.

More recently, the class of linear alternating polymers of carbon monoxide and at least one ethylenically unsaturated hydrocarbon, now commonly known as polyketones or polyketone polymers, has become of greater interest in part because of the greater availability of the polymers. The more recent general processes for the production of the polyketone polymers are illustrated by a number of published European Patent Applications Nos. including 121,965, 181,014, 213,671 and 257,663. The processes involve the use of a catalyst composition formed from a compound of a Group VIII metal selected from palladium, cobalt or nickel, the anion of a non-hydrohalogenic acid having a pKa below about 6, preferably below 2, and a bidentate ligand or phosphorus, arsenic or antimony.

The resulting polymers are relatively high molecular weight materials having utility as premium thermoplastics in the production of shaped articles such as containers for food and drink by processing methods which are conventional for thermoplastics. The polymers are relatively crystalline materials with well defined melting points. However, during processing operations which involve multiple melting/solidification cycles, the polymers do tend to lose crystallinity which may have an adverse effect on certain of the desirable properties of the polymer. It would be of advantage to provide compositions of the linear alternating polymers which are stabilized against undue loss of crystallinity, i.e., have an improved melt stability, upon being subjected to melting and solidification.

SUMMARY OF THE INVENTION

The present invention provides stabilized compositions comprising linear alternating polymers of carbon monoxide and at least one ethylenically unsaturated hydrocarbon. More particularly, the invention relates to such polymers stabilized against loss of crystallinity upon being subjected to melting and solidification by inclusion therein of an aluminum phenoxide, and to a method of stabilizing the compositions against such loss of crystallinity.

DESCRIPTION OF THE INVENTION

The polymers which are stabilized against undue loss of crystallinity according to the invention are linear alternating polymers of carbon monoxide and at least one ethylenically unsaturated hydrocarbon. The ethylenically unsaturated hydrocarbons which are useful as precursors of the polyketone polymers have up to 20 carbon atoms inclusive, preferably up to 10 carbon atoms, and are aliphatic such as ethylene and other alpha-olefins including propylene, 1-butene, isobutylene, 1-hexene, 1-octene and 1-dodecene, or are arylaphatic containing an aryl substituent on an otherwise aliphatic molecule, particularly an aryl substituent on a carbon atom of the ethylenic unsaturation. Illustrative of this latter class of ethylenically unsaturated hydrocarbons are styrene, p-methylstyrene, p-ethylstyrene and m-isopropylstyrene. Preferred polyketone polymers are copolymers of carbon monoxide and ethylene or terpolymers of carbon monoxide, ethylene and a second hydrocarbon of at least 3 carbon atoms, particularly an alpha-olefin such as propylene.

When the preferred terpolymers of carbon monoxide, ethylene and a second hydrocarbon are employed in the compositions of the invention, there will be at least about 2 units incorporating a moiety of ethylene for each unit incorporating a moiety of the second hydrocarbon. Preferably there will be from about 10 units to about 100 units incorporating a moiety of ethylene for each unit incorporating a moiety of the second hydrocarbon. The polymer chain of the preferred polymers is therefore represented by the repeating formula

$$+CO+CH_2-CH_2+_x+O-G_y \quad (I)$$

wherein G is a moiety of the second hydrocarbon polymerized through the ethylenic unsaturation. The —CO—CH$_2$—CH$_2$— units and the —CO—G— units are formed randomly throughout the polymer chain and the ratio of y:x is no more than about 0.5. In the modification of the invention where copolymers are employed without the presence of the second hydrocarbon, the polymers are represented by the above formula I wherein y is 0. When y is other than 0, i.e., terpolymers are employed, ratios of y:x from about 0.01 to about 0.1 are preferred the endgroups or "caps" of the polymer chain will depend upon what materials are present during polymerization and how or whether the polymer is purified. The precise nature of the endgroups is of little significance so far as the overall properties of the polymer are concerned so that the polymers are fairly represented by the formula for the polymeric chain as depicted above.

Of particular interest are the polymers of the above formula having a molecular weight of from about 1000 to about 200,000, particularly those polymers having a molecular weight of from about 20,000 to about 90,000, as determined by gel permeation chromatography. The physical properties of the polymers will depend in part upon the molecular weight, whether the polymer is a copolymer or a terpolymer and, in the case of terpolymers, the nature of and the proportion of the second hydrocarbon. Typical melting points for such polymers are from about 175° C. to about 300° C., but more often from about 210° C. to about 270° C. Such polymers will typically have a limiting viscosity number, expressed in dl/g, of from about 0.4 to about 10, preferably from about 0.8 to about 4.

The polymers are produced by the process illustrated by the above published European Patent Applications. Although the scope of the polymerization process is extensive, a preferred catalyst composition is formed from a palladium carboxylate, preferably palladium acetate, the anion of trifluoroacetic acid or p-toluenesulfonic acid, and a bidentate ligand of phosphorus such as 1,3-bis(diphenylphosphino)propane or 1,3-bis[di(2-methoxyphenyl)phosphino]propane. The polymerization process is typically conducted by contacting the monomers under polymerization conditions in the presence of the catalyst composition and in the presence of an inert reaction diluent. Suitable reaction diluents include lower alkanols such as methanol and ethanol, lower alkyl ketones such as acetone or methyl ethyl ketone, or mixtures thereof. Polymerization conditions will include a reaction temperature of from about 20° C. to about 150° C. but reaction temperatures of from about 30° C. to about 135° C. are preferred. Typical reaction pressures are from about 10 bar to about 200 bar, more frequently from about 20 bar to about 100 bar. Subsequent to reaction the polymer is recovered from the polymer-containing suspension by conventional methods such as filtration or decantation. The polymer is used as such or is purified by treatment with a solvent which is selective for the catalyst composition residues.

The polyketone polymers are stabilized according to the invention by the inclusion therein of a stabilizing quantity of an aluminum phenoxide having at least one phenoxide substituent which is a hindered phenoxide substituent having bulky alkyl groups in ring positions ortho to the carbon atom through which the phenoxide is attached to the aluminum. One class of such aluminum phenoxides is represented by the formula

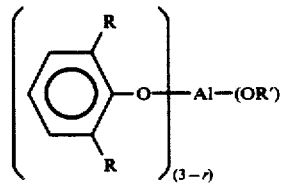

wherein R independently is branched alkyl of from 3 to 5 carbon atoms inclusive, R' independently is alkyl of up to 10 carbon atoms inclusive, Preferably lower alkyl of up to 4 carbon atoms inclusive, or phenyl, and r is 0, 1 or 2. When the R' is alkyl, groups such as methyl, ethyl, isopropyl, sec-butyl, hexyl, octyl and decyl are suitable. Illustrative R groups include isopropyl, tert-butyl, sec-butyl and tert-amyl. A preferred R group is tert-butyl.

The aluminum phenoxides that are suitably employed in the compositions of the invention to stabilize the polyketone polymers against undue loss of crystallinity are illustrated by dimethyoxyaluminum 2,6-di-isopropylphenoxide, diisopropoxyaluminum 2,6-di-tert-amylphenoxide, diethyoxyaluminum 2,6-di-tert-butylphenoxide, diphenoxyaluminum 2,6-di-tert-butylphenoxide, butoxyaluminum bis(2,6-di-isobutylphenoxide), phenoxyaluminum bis(2,6-di-isopropylphenoxide) and aluminum tris(2,6-di-tert-butylphenoxide). The compounds of the above formula II wherein r is Z are generally preferred and particularly preferred are dialkoxyaluminum or diphenoxyaluminum 2,6-di-tert-butylphenoxides.

The aluminum phenoxide stabilizer is employed in a stabilizing quantity. Amounts of the aluminum phenoxide from about 0.05% by weight to about 10% by weight based on total composition, are suitable with amounts of from about 0.1% by weight to about 3% by weight on the same basis being preferred. The stabilizer is added to the polyketone polymers to produce the compositions of the invention by methods conventional for producing an intimate mixture of a polymer and a solid stabilizer. Such methods include the production of a dry blend of the polymer in particulate form and the stabilizer followed by passage of the blend through an extruder to form the stabilized composition as an extrudate. In another modification, the composition is produced in a mixing device such as a mixer or a blender operating at high shear. The stabilized compositions may also include other additives such as colorants, plasticizers, fibers or reinforcements or dyes which are added to the polymer together with or separately from the aluminum phenoxide stabilizer. The stabilized compositions of the invention are stabilized against the undue loss of crystallinity when subjected to processing operations involving melting and crystallization (solidification) cycles. The presence of the aluminum phenoxide offers the additional advantage of an improved processability when the polymeric materials are processed as by passing through an extruder. In a typical illustrative example, a polymeric composition is formed as nibs by passage through an extruder operating above the melting point of the polymer. The nibs are again melted and injection molded to produce a shaped article. In both cases the retained apparent crystallinity of the polymer is higher by virtue of the incorporation therein of the aluminum phenoxide stabilizer. Although the polymeric compositions of the invention are suitably processed by conventional methods which do not involve the melting and solidification of the polymer, the advantages of the stabilized compositions are most apparent when the compositions are processed by methods employing multiple cycles of melting and solidification.

The compositions of the invention are useful in the manufacture of films, fibers, wires and cables and shaped articles made by conventional procedures such as extrusion, injection molding or thermoforming. The compositions are particularly useful when properties of dimensional stability at elevated temperatures are desired for articles produced by methods which include melting and solidification techniques.

The invention is further illustrated by the following Illustrative Embodiments which should not be regarded as limiting the invention.

Illustrative Embodiment I

A linear alternating terpolymer of carbon monoxide, ethylene and propylene (087/032) in the presence of a catalyst composition formed from palladium acetate, trifluoroacetic acid and 1,3-bis[di(2-methoxyphenyl)-phosphino]propane. The polymer had a melting point of 220° C. and an LVN, measured in m-cresol at 60° C., of 1.96 dl/g.

Illustrative Embodiment 11

In this Illustrative Embodiment, samples of the terpolymer of Illustrative Embodiment I and of the polymer stabilized with an aluminum phenoxide were examined by the use of a Perkins-Elmer differential scanning calorimeter (DSC). The DSC evaluation serves to measure melting points and crystallization (solidification)

temperatures or alternatively heats of melting and heats of fusion. The DSC employs samples of the polymer or a polymer composition in sealed pan containers. The pan and contents are heated at a controlled rate, typically 20° C./minute, until the temperature at which the sample has melted, $T_m1$, is reached. The pan and contents are then cooled until reaching the temperature at which the sample has solidified, $T_c1$, and then heated past a second melting point, $T_m2$, to 285° C. at which temperature the sample is maintained for 10 minutes. The pan and contents are then cooled until the sample has solidified a second time, $T_c2$. The melting point and crystallization temperature are defined as the temperatures at which the heat flow reaches a maximum (for melting) or a minimum (for crystallization). Typically the melting point $T_m$ will be higher than the crystallization temperature $T_c$. Although a number of factors influence the melting point and crystallization temperature, these values are influenced by the crystallinity of the polymer. In general, the smaller the difference between the first and second melting points, the greater the degree of retained crystallinity. The same relationship is generally true for the crystallization temperatures.

It is also possible through the use of the DSC to determine the magnitude of the first and second heats of melting ($H_1$ and $H_2$) and the first and second heats of crystallization ($C_1$ and $C_2$) for the stabilized polymer compositions and for the unstabilized polymer. In general, the heats of crystallization for the stabilized polymer composition will be greater than the heats of crystallization for the unstabilized polymer. The greater this difference is, the greater the degree of crystallinity which has been retained by the polymer composition.

Samples of the polymer of Illustrative Embodiment I and of polymer containing each of several aluminum phenoxides were prepared by cryogrinding the polymer, and adding to the polymer in a plastic bottle the aluminum phenoxide, if any, and heptane. The samples were tumbled overnight and then placed in a vacuum oven at 50° C. for 18 hours to remove the heptane and dry the sample. The sample was then extruded using a 15 mm twin screw Baker Perkins extruder operating at 275° C. and 300 rpm in air. Sample A in the data that follow is the unstabilized polymer. Sample B is the polymer containing 1% by weight, based on total composition, of diphenoxyaluminum 2,6-di-tert-butylphenoxide and Sample C is the polymer containing 1% by weight, based on total composition, of diisopropoxyaluminum 2,6-di-tert-butylphenoxide. These samples were evaluated by the DSC technique described above. The results are shown in the Table.

TABLE

| Sample | Relative Feed Rate | $T_c2$ | $C_2/C_1$ | $C_2$ |
|---|---|---|---|---|
| A | 1.0 | 148 | 0.66 | 10.5 |
| B | 2.1 | 164 | 0.93 | 15.4 |
| C | 1.7 | 163 | 0.88 | 14.6 |

What is claimed is:

1. A composition stabilized against undue loss of crystallinity during melting and solidification which comprises:
   a linear alternating polymer of carbon monoxide and at least one ethylenically unsaturated hydrocarbon, wherein the polymer is represented by the repeating formula

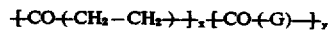

wherein G is a moiety of an ethylenically unsaturated hydrocarbon of at least 3 carbon atoms polymerized through the ethylenic unsaturation and the ratio of y:x is no more than about 0.5; and
a stabilizing quantity of an aluminum phenoxide, wherein the aluminum phenoxide is represented by the formula

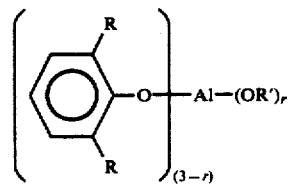

wherein R independently is a branched alkyl of from 3 to 5 carbon atoms, R' is an alkyl of up to 10 carbon atoms or phenyl, and r is 0, 1 or 2.

2. The composition of claim 1 wherein the stabilizing quantity is from about 0.05% to about 10% by weight, based on total composition.

3. The composition of claim 2 wherein y is 0.

4. The composition of claim 2 wherein G is a moiety of propylene.

5. The composition of claim 4 wherein the ratio of y:x is from about 0.01 to about 0.1.

6. The composition of claim 5 wherein r is 2.

7. The composition of claim 6 wherein R is tert-butyl.

8. The composition of claim 7 wherein R' is phenyl.

9. The composition of claim 7 wherein R' is isopropyl.

10. A method of stabilizing a linear alternating polymer of carbon monoxide and at least one ethylenically unsaturated hydrocarbon against undue loss of crystallinity during melting and solidification cycles by incorporating therein a stabilizing quantity of an aluminum phenoxide, wherein the polymer is represented by the formula

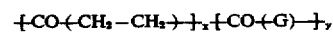

wherein G is a moiety of an ethylenically unsaturated hydrocarbon of at least 3 carbon atoms polymerized through the ethylenic unsaturation and the ratio of y:x is no more than about 0.5, and wherein the aluminum phenoxide is represented by the formula

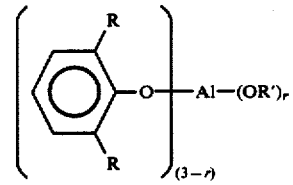

wherein R independently is a branched alkyl of from 3 to 5 carbon atoms, R' is an alkyl of up to 10 carbon atoms or phenyl, and r is 0, 1 or 2.

11. The method of claim 24 wherein the stabilizing quantity is from about 0.05% to about 10% by weight, based on total composition.

12. The method of claim 11 wherein y is 0.

13. The method of claim 11 wherein G is a moiety of propylene.

14. The method of claim 13 wherein the ratio of y:x is from about 0.01 to about 0.1.

15. The method of claim 14 wherein r is 2.

16. The method of claim 15 wherein R is tert-butyl.

17. The method of claim 16 wherein R' is phenyl.

18. The method of claim 16 wherein R' is isopropyl.

* * * * *